(12) United States Patent
Jesionowski (10) Patent No.: US 6,216,057 B1
(45) Date of Patent: Apr. 10, 2001

(54) SYSTEM FOR AUDITING STORAGE CARTRIDGES IN A LIBRARY STORAGE SYSTEM

(75) Inventor: Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/413,992

(22) Filed: Oct. 7, 1999

Related U.S. Application Data (62) Division of application No. 09/055,339, filed on Apr. 3, 1998, now Pat. No. 6,023,643.

(51) Int. Cl.[7] ................................................ G06F 19/00
(52) U.S. Cl. ............................................. 700/214; 369/34
(58) Field of Search ................................ 700/214, 215, 700/218; 369/34

(56) References Cited

U.S. PATENT DOCUMENTS

| | | |
|---|---|---|
| 5,059,772 | 10/1991 | Younglove . |
| 5,303,214 | 4/1994 | Kulakowski et al. . |
| 5,343,403 | 8/1994 | Beidle et al. . |
| 5,546,315 | 8/1996 | Kleinschnitz . |
| 5,652,742 | 7/1997 | Baca et al. . |
| 5,872,751 * | 2/1999 | Utsumi et al. .......................... 369/34 |
| 6,023,643 * | 2/2000 | Jesionowski .......................... 700/214 |

OTHER PUBLICATIONS

IBM Corporation, May 1994, IBM 3995 ESA/370 and ESA/390, Optical Library Dataserver: Storage Administration Guide for Models 153, 151, 113, and 111, IBM Doc. No. GA32–0242–01 (selected pages only).

IBM Corporation, Nov. 1996, IBM Automated Tape Library Dataservers: A Practical Guide, IBM Doc. No. SG24–4632–00 (selected pages only).

IBM Corporation, IBM 3995 Optical Library Dataserver Products: Introduction and Planning Guide, IBM Doc. No. GA32–0121–06 (selected pages only).

IBM Corporation Technical Disclosure, Library Doors Interlock Automatic Addressing, vol. 39, No. 04, Apr. 1996 (selected pages only).

* cited by examiner

Primary Examiner—Christopher P. Ellis
Assistant Examiner—Khoi H. Tran
(74) Attorney, Agent, or Firm—David W. Victor; Konrad Raynes & Victor (57) ABSTRACT

Disclosed is a system for indicating whether a group of at least one library element was accessed. The library elements are contained within a housing and are capable of holding storage cartridges. A controller is signaled when an access door of the housing is in an open position. An operator may access the library elements when the access door is in the open position. A motion detector directed toward the group of library elements is activated to detect whether at least one library element in the group was accessed. The motion detector signals the controller upon detecting that at least one library element in the group was accessed. The controller then indicates in a memory area that at least one of the library elements in the group was accessed after the controller is signaled that the access door is in the open position and that at least one library element in the group was accessed. The contents of the library elements included in the group may then be audited to update a cartridge map with information on the actual contents of the library elements in the group.

9 Claims, 7 Drawing Sheets

SYSTEM FOR AUDITING STORAGE CARTRIDGES IN A LIBRARY STORAGE SYSTEM

This application is a division of U.S. application Ser. No. 09/055,339, filed Apr. 3, 1998, now U.S. Pat. No. 6,023,643.

BACKGROUND OF THE INVENTION

1. Field of the Invention

The present invention relates to a system for auditing the contents of library elements capable of holding storage cartridges in an automated library.

2. Description of the Related Art

An automated information storage and retrieval system, also known as an automated library, includes an array of storage cells, i.e., storage slots, that hold storage cartridges, such as optical disks or magnetic tapes that are portable and removable from the library. The term "storage cartridge" as used herein refers to any structure for housing such removable information media The library further includes one or more drives to read information from the storage cartridges located in the storage cells.

Figure 1:
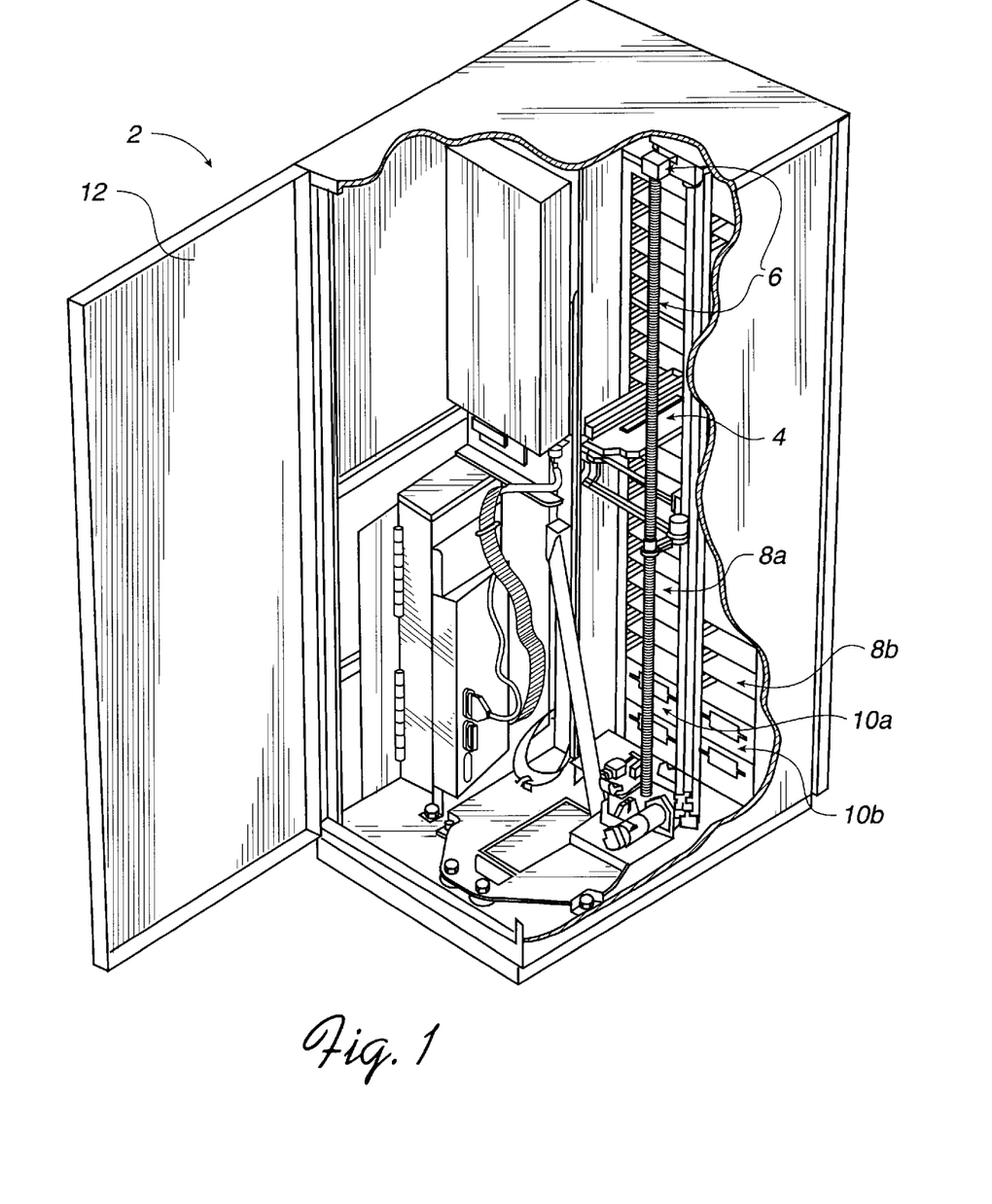
FIG. 1 illustrates a view of the inside components of an automated optical disk library.

FIG. 1 illustrates an automated library 2, such as the International Business Machines Corporation ("IBM®") 3995 Optical Library Dataserver, which is described in IBM publication "3995 ECKD Storage Administration Guide", document no. GA32-0242-02 (IBM Copyright, 1994), which publication is incorporated herein by reference in its entirety. A similar automated library system is described in U.S. Pat. No. 5,652,742, entitled "Cartridge Retention in Storage Cell Arrays," assigned to IBM, the assignee of the subject patent application, which patent is incorporated herein by reference in its entirety.

The library 2 includes a controller, an input/output station, a picker assembly 4, a carriage assembly 6, storage cells 8a, b, and optical disk drives (not shown). The term "library element" as used herein refers to any slot in the automated library 2 in which storage cartridges may be disposed, e.g., the input/output stations, the storage cells 8a, b, the disk drives, etc. The library controller includes a processor, RAM, and other controls and interfaces to direct the actions of the library components. The controller further interacts with a host processor to respond to library commands transmitted from the host processor. The input/output station is the opening through which the user may insert or remove a cartridge. An operator panel on the outside of the box housing the tape library allows the user to communicate with the library controller. When adding a cartridge through the input/output slot, the user may indicate the addition of a cartridge using the operator panel. The library 2 also includes an access door 12 through which the user may add or remove cartridges maintained in the storage cells 8a, b.

The library 2 has two columns of storage cells 8a, b and optical disk drives 10a, b that perform read and write operations with respect to the storage cartridges. A picker assembly 4 is capable of manipulating the storage cartridges in the library elements. A carriage assembly 6 moves the picker assembly 4, and any cartridge held by the picker assembly 4, among the library elements. The carriage assembly 6 transports the picker assembly 4 to a destination library element. The picker assembly 4 can rotate to turn the cartridge over. The picker assembly 4 has a finger mechanism to remove or insert a storage cartridge to a library element. Once inserted in the drive 10a, b, data can be read from the cartridge and sent to a host processor. Data transmitted from the host processor can be written to the storage cartridge inserted in the drive 10a, b.

The picker assembly 4 may also be equipped with a machine vision system, such as a bar code reader, to read a label on the cartridge when the picker assembly 4 is positioned near a library element During an inventory of the library, such as when a new library is installed, the machine vision system scans the library elements. The machine vision system then informs the library controller of the identity of the stored cartridges and their location in the library elements. Alternatively, in a library without a vision system, each cartridge must be loaded into a drive 10a, b in order to read cartridge identifier information stored within the cartridge. After reading the identifying information, the storage cartridge is returned to the originating library element. The library controller records the identity and location information in a database to "know" the contents of each storage cell and the identity and location of the storage cartridges within the array of library elements.

An audit of the storage cartridges in library elements updates information in a cartridge map indicating the contents of the library elements. The cartridge map is stored in a memory accessible to the library controller. To audit the contents of the library elements, the library controller directs the machine vision system, if available, to first determine whether the library elements are empty. The library controller would then direct the machine vision system to read the label on the storage cartridge in the library element. The library controller would then update the cartridge map to reflect the current status of the library elements determined during the audit. This auditing process often takes several minutes. If the library 2 does not include machine vision equipment for reading the cartridges, then the audit is even more time consuming because each cartridge must be loaded into a drive 10a, b to obtain information on the contents of the storage cartridge before updating the cartridge map with the current information on that cartridge.

Typically, an inventory of the entire array of library elements must be taken whenever the library operator opens the access door 12, even if the operator did not alter the contents of any library element in the array. In the current art, the system "assumes" that all library elements have been altered whenever the access door is opened.

SUMMARY OF THE INVENTION

To overcome the limitations in the prior art described above, the present invention discloses a system for indicating whether a group of at least one library element was accessed. The library elements are contained within a housing and are capable of holding storage cartridges. A controller is signaled when an access door of the housing is in an open position. An operator may access the library elements when the access door is in the open position. A motion detector directed toward the group of library elements is activated to detect whether at least one library element in the group was accessed. The motion detector signals the controller upon detecting that at least one library element in the group was accessed. The controller then indicates in a memory area that at least one of the library elements in the group was accessed after the controller is signaled that the access door is in the open position and that at least one library element in the group was accessed.

In further embodiments, the library elements in the group of library elements are audited after determining that the memory area indicates that at least one of the library elements in the group was accessed Auditing is performed by accessing the library elements in the group. For each accessed library element, the actual contents of the accessed library element are determined. Then, a cartridge map with information on the contents of the accessed library element is updated with information on the actual contents of the library element. The cartridge map is stored in the memory area and maintains information on contents of the library elements.

In yet further embodiments, the motion detector is comprised of light emitting sensors that detect when a library element is accessed by detecting when a light beam generated by one of the sensors is interrupted. Only those library elements in groups covered by a light beam that is interrupted are audited.

The preferred embodiments of the present invention reduce the need to audit all the library elements when the access door is opened. By using a motion detector to detect a section of library elements that may have been accessed, only those library elements within such section are audited. The preferred embodiments thus reduce audit time by avoiding an audit of library elements that could not have been accessed when the access door was opened as indicated by the motion detector detecting access while the access door is opened.

BRIEF DESCRIPTION OF THE FIGURES

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 2:
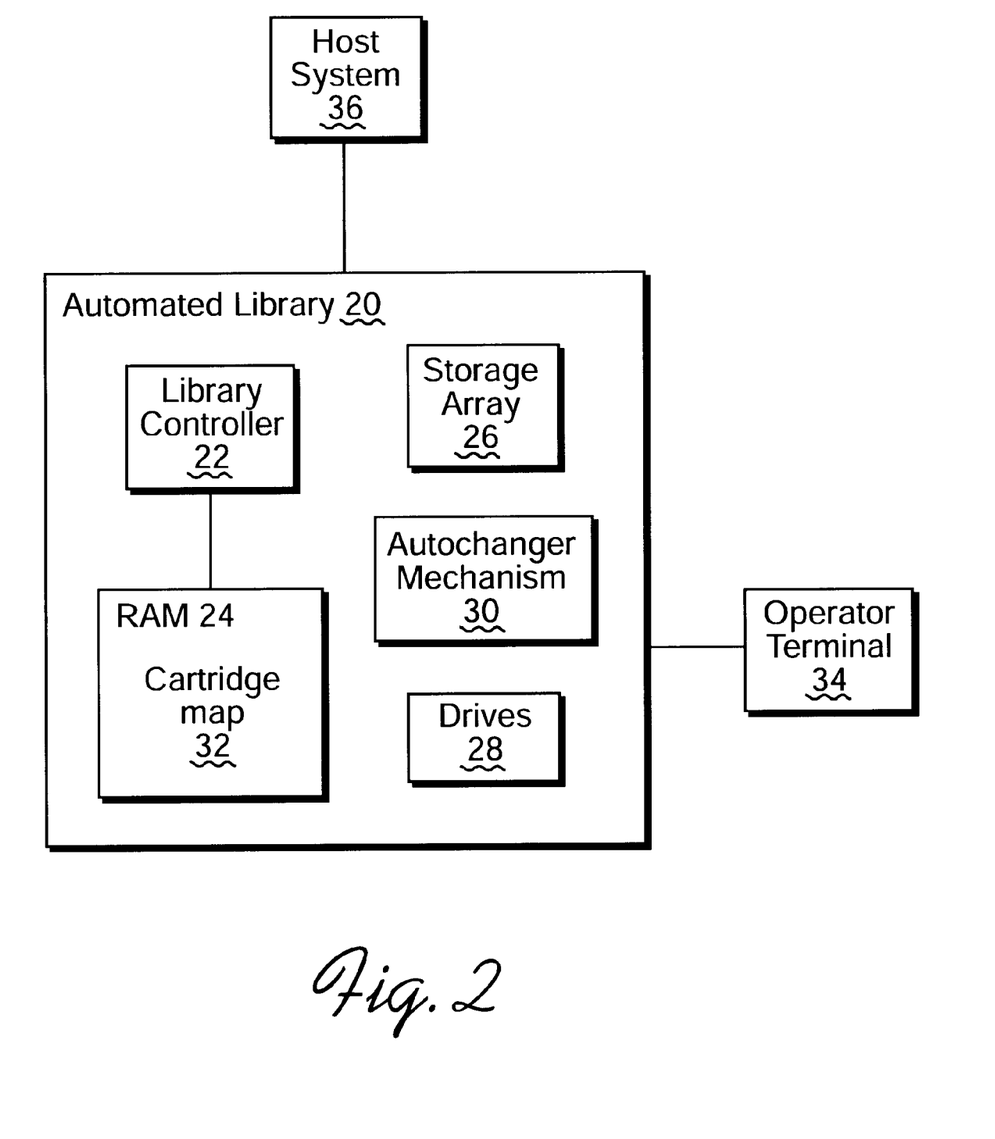
FIG. 2 is a block diagram illustrating a preferred hardware environment in which preferred embodiments of the present invention are implemented.

FIG. 2 illustrates an environment in which an automated library in accordance with preferred embodiments of the present invention operate. An automated library 20 includes a library controller 22, a RAM 24 accessible to the library controller 22, a storage array 26 of storage cells for holding storage cartridges, input/output slots (not shown) through which the user may insert storage cartridges, drives 28 to perform read/write operations on storage cartridges loaded therein, and an authochanger mechanism 30 to transfer storage cartridges between the storage array 26 and drives 28. The storage cartridges maintained in the automated library 20 may be of a single medium type, such as optical disks, magnetic disks, holographic units, etc. Alternatively, the cartridges may be of mixed media-type. In such case, the drives 28 must include at least one drive for each media type maintained within the automated library 20.

In preferred embodiments, the library controller 22 is comprised of a microprocessor and various controls and interfaces to control the operation of the components in the automated library 20, including the autochanger mechanism 30 and drives 28. The library controller 22 utilizes the RAM 24 to store various information, such as a cartridge map 32 maintaining information on whether one or more of the library elements are empty. If the library element includes a storage cartridge, then the cartridge map 32 would include information on the contents of the storage cartridges maintained in the library element, such as volume information. The map 32 may include volume information for a storage cartridge in a particular library element. If the library controller cannot determine content information for a particular library element, then the cartridge map 32 would only indicate whether the library element was empty or not. For instance, the library controller may not be able to scan a label on the storage cartridge when it is positioned in a drive 28. In such case, for the drive 28 library elements, the cartridge map 32 would only indicate whether such library element was empty.

The automated library controller 20 further includes a non-volatile storage unit (not shown), e.g., hard disk drive, PROM, EEPROM, non-volatile RAM, etc, that stores the microcode that controls the library controller 22. In further embodiments, the library controller 22 may store and/or backup the cartridge map 32 in a nonvolatile storage unit such as a non-volatile RAM or hard disk drive. In certain embodiments, the automated library 20 includes a display to provide information and a control interface to the library operator.

A library operator may directly control operations and the management of storage cartridges through an operator terminal 34, consisting of a display device and keyboard, to interface with the library controller 22. A host system 36 may send commands to the library controller 22 to control operations within the automated library 20 or perform read or write operations on volumes within cartridges managed by the library controller 22. The host system 36 and library 20 may communicate via SCSI adaptors and a SCSI cable. In further embodiments, the host system 36 and library 20 may communicate via any communication means known in the art, e.g., LAN, WAN, System Area Network (SAN), ESCON adaptors and an ESCON communication line, Fibre Channel, etc.

Figure 3:
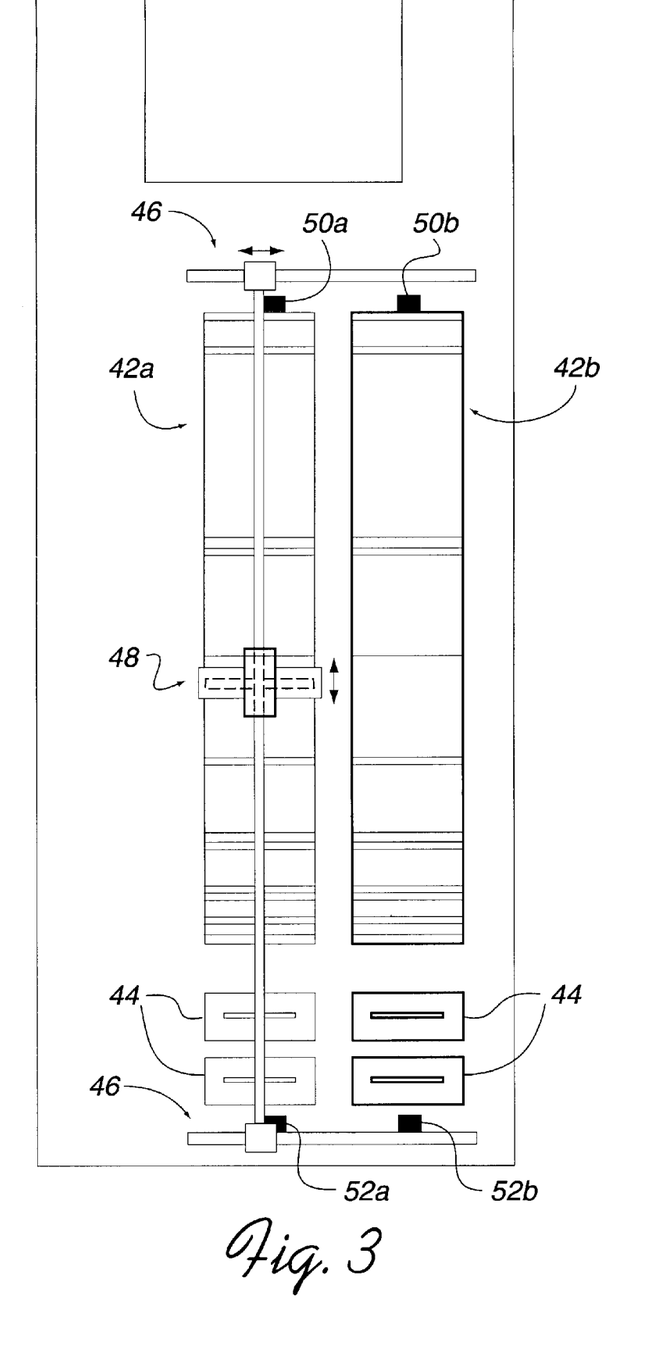
FIG. 3 is a diagram illustrating the arrangement of the storage retrieval components of an automated library in accordance with a preferred embodiment of the present invention.

FIG. 3 illustrates an embodiment of an automated retrieval system included in the automated library 20. The retrieval system may be included in a box such as that shown in FIG. 1, having an access door. The storage array 26 is comprised of two columns of library elements 42a, 42b. Each column 42a, b includes a plurality of storage cells for holding cartridges and drives 44, such as disk drives, tape drives, etc. Storage cartridges maintained in the storage cells may be inserted into the drives 44 where read/write operations may then be performed on the cartridge. A carriage assembly 46 can slidably move horizontally between the columns 42a, b in response to signals from the library controller 22. A picker assembly 48 is slidably mounted on the carriage assembly 46 and includes robotic components known in the art, such as a robotic finger, that are capable of removing or inserting cartridges from the library elements in the columns 42a, b. The picker assembly 48 and components thereof, such as the robotic finger, move in response to signals from the controller 22. The picker assembly 48 may move between the library elements within a column 42a, b and between columns 42a, b using the carriage assembly 46 in order to transfer storage cartridges therebetweeen. In preferred embodiments a machine vision system (not shown) may be mounted on the picker assembly 48 to determine whether a storage cartridge is located in a library element and/or to read labels on the storage cartridges in order to identify the cartridge and the volume data maintained by such cartridge. If machine vision equipment is not included, then in order to identify the contents of a storage cartridge, the library controller 22 would have to cause the picker assembly 48 to transfer the cartridge from a storage cell to one of the drives 44 where information on the contents of the storage cartridge could be read.

A pair of vertically oriented sensors 50a, b and 52a, b are located in each column 42a, b. A vertical beam is generated between sensors 50a and 52a across the library elements in column 42a. Another vertical beam is generated between sensors 50b and 52b across the library elements in column 42b. In preferred embodiments, sensors 52a, b are transmitting LEDs that project a vertical beam upward that is received by sensors 50a, b, respectively. If an object interrupts or intersects the vertical beam, a signal is transmitted from the receiving sensor 50a, b to the library controller 22 indicating such interruption in the vertical beam. In alternative embodiments, different sensing mechanisms positioned in alternative locations could be used to determine whether a cartridge is removed or added to a library element, including lasers, motion detectors, heat sensors, and any other detector known in the art that detects motion within a range and converts the detection of that motion to a digital representation.

The library 20 further includes a detecting mechanism, such as a sensor, electro-mechanical trigger or any suitable detecting mechanism known in the art, to determine if the access door has been opened. For instance, the door detecting mechanism may be a light emitting diode type sensor to detect when the access door is in an open position or an electromechanical device triggered when the access door is in the open position. This detecting mechanism may be located adjacent to the access door or at some other location within the housing of the library 20. This detecting mechanism would signal the library controller 22 that the access door has been opened. In response, to this signal from the door detecting mechanism, the library controller 22 could activate the motion detector device, e.g., sensors 50a, b, to inform the library controller 22 of an attempt at access to the library elements. In alternative embodiments, the operator must enter a command to cause the library controller 22 to open the door or release a lock to allow the operator to open the door. In embodiments where the library controller opens the door 22, the library controller 22 would control a solenoid or other electromechanical mechanism to move the access door to the open position.

In preferred embodiments, the sensors 50a, b and 52a, b are positioned such that movement of the picker assembly 48 does not interrupt the beams when the picker assembly 48 is not inserting and adding storage cartridges to library elements and that any cartridges added or removed from one of the library elements in a column 42a, b or drive 44 is detected by an interruption to the beam. In this way, the library controller 22 can detect which column 42a, b of library elements had a cartridge removed or added therefrom by determining which vertical beam was interrupted.

Figure 4:
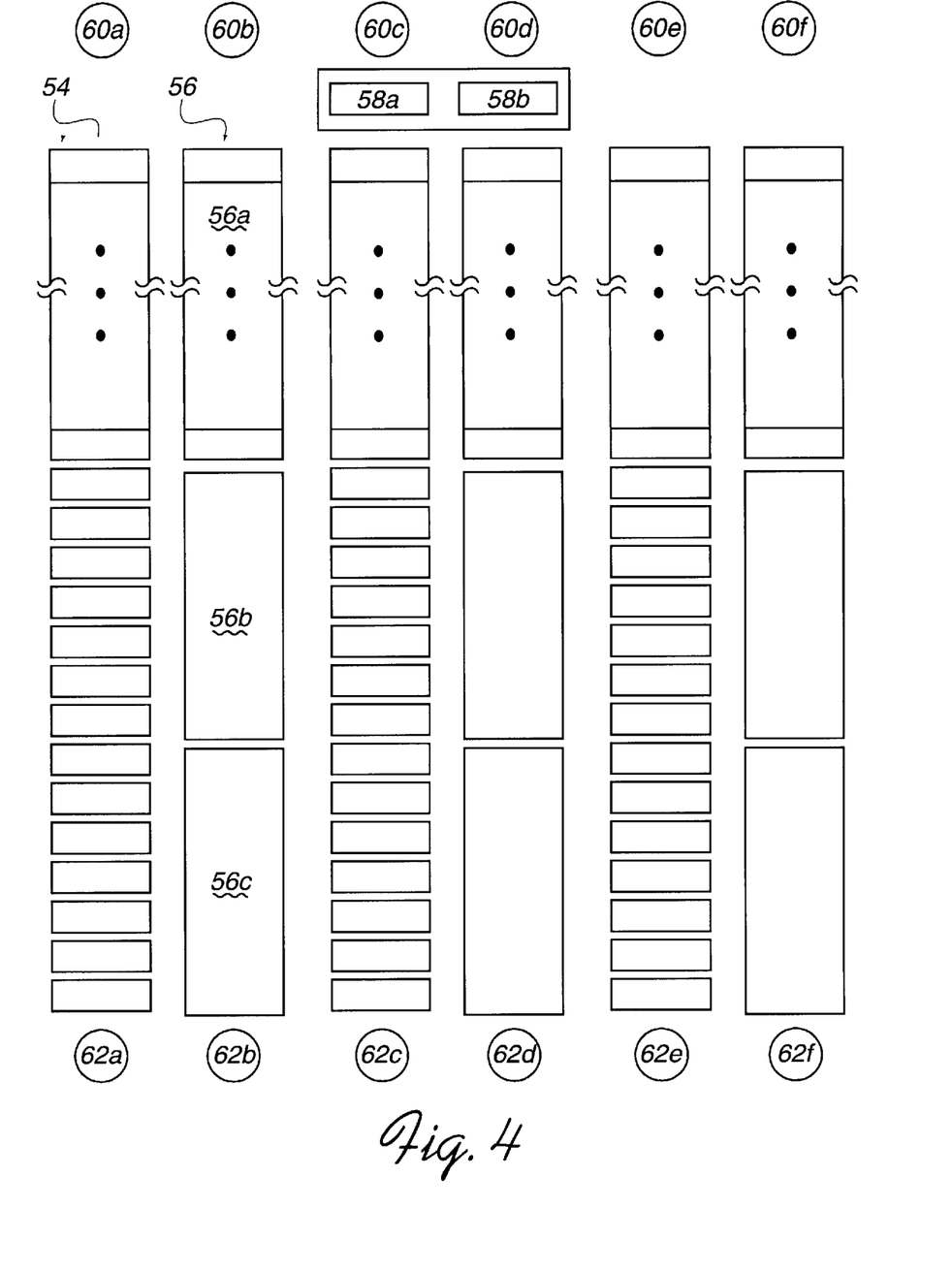
FIG. 4 is a diagram illustrating the arrangement of the storage retrieval components of an automated library in accordance with a preferred embodiment of the present invention.

FIG. 4 illustrates an alternative embodiment of multiple columns of library elements. Such an arrangement of the storage cells and drives is described in IBM publication "Magstar MP 3575 Tape Library Dataserver Operator Guide," publication no. GA32-0381-00 (IBM Copyright 1997), which publication is incorporated herein by reference in its entirety. The 3575 system is for tape cartridges. Column 54 is comprised of storage cells for the tape cartridges, column 56 includes a first section 56a of storage cells, and sections 56b and 56c are tape drives. The other columns include a similar arrangement. Openings 58a and 58b are input/output slots through which the user may insert tape cartridges. Sensors 60a, b, c, d, e, f receive a vertical beam transmitted from sensors 62a, b, c, d, e, f, respectively. If a beam is interrupted by insertion or removal of a tape cartridge from one of the library elements, then the receiving sensor 60a, b, c, d, e will indicate such interruption to the library controller 22.

Thus, the preferred embodiments may be implemented as a method, apparatus or article of manufacture using standard programming and/or engineering techniques to produce software, firmware, hardware, or any combination thereof The term "article of manufacture" (or alternatively, "computer program product") as used herein is intended to encompass a computer program accessible from any computer-readable device, carrier, or media Of course, those skilled in the art will recognize many modifications may be made to this configuration without departing from the scope of the present invention.

Those skilled in the art will recognize that the embodiments illustrated in FIGS. 2, 3, and 4 are not intended to limit the present invention. Indeed, those skilled in the art will recognize that other alternative hardware environments and programs may be used without departing from the scope of the present invention.

Using Sensors to Determine When to Audit The Cartridges in the Library Elements

Figure 5:
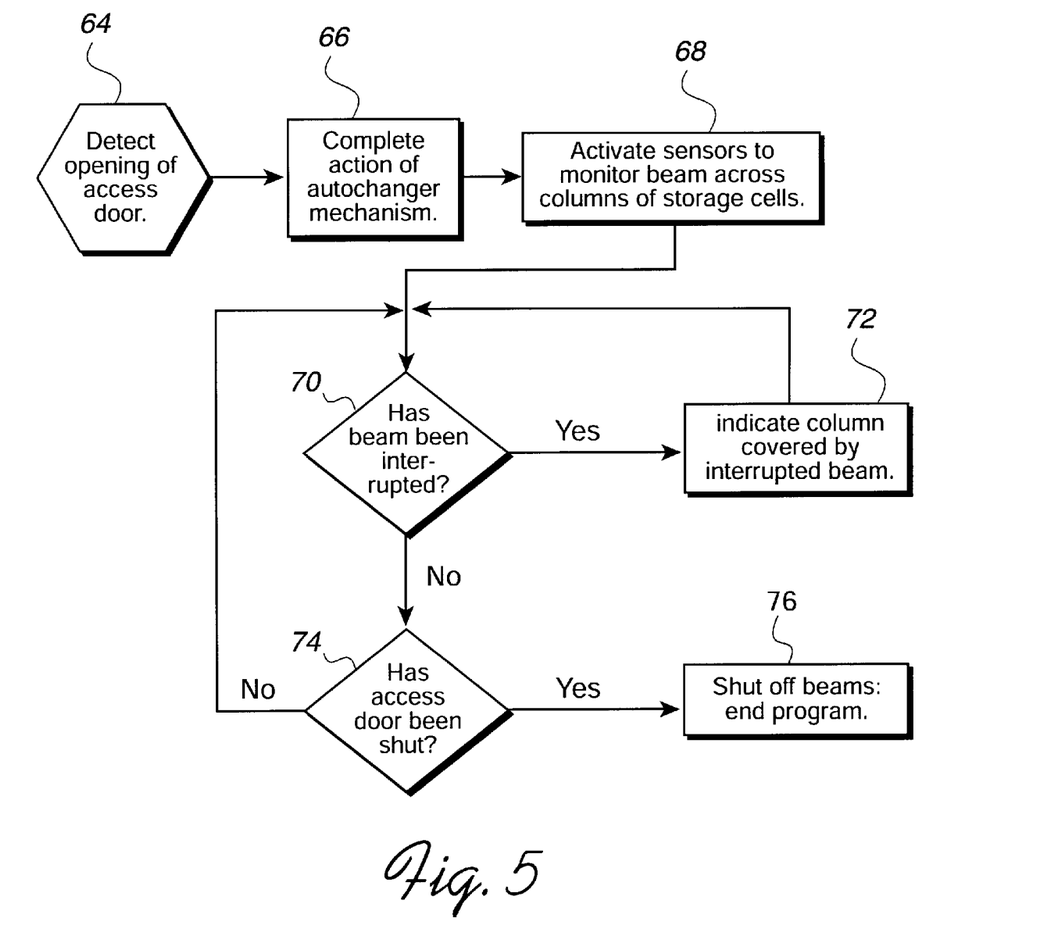
FIG. 5 is a flowchart illustrating general logic implemented in a library controller for indicating whether a library element was accessed in accordance with preferred embodiments of the present invention.
Figures 6, 6A:
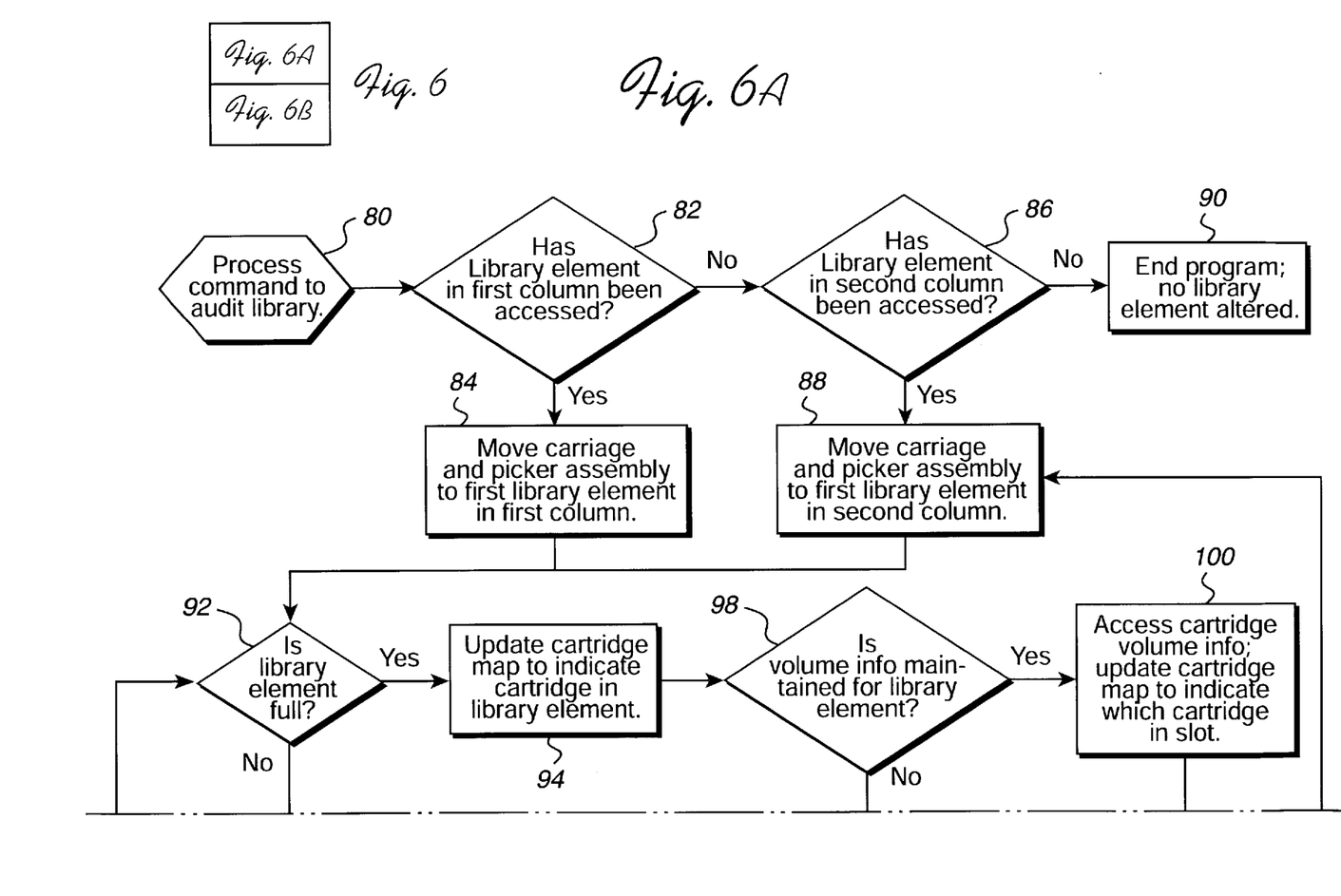
FIG. 6 is a flowchart illustrating general logic implemented in a library controller for auditing the contents of the library elements in accordance with preferred embodiments of the present invention.
Figure 6B:
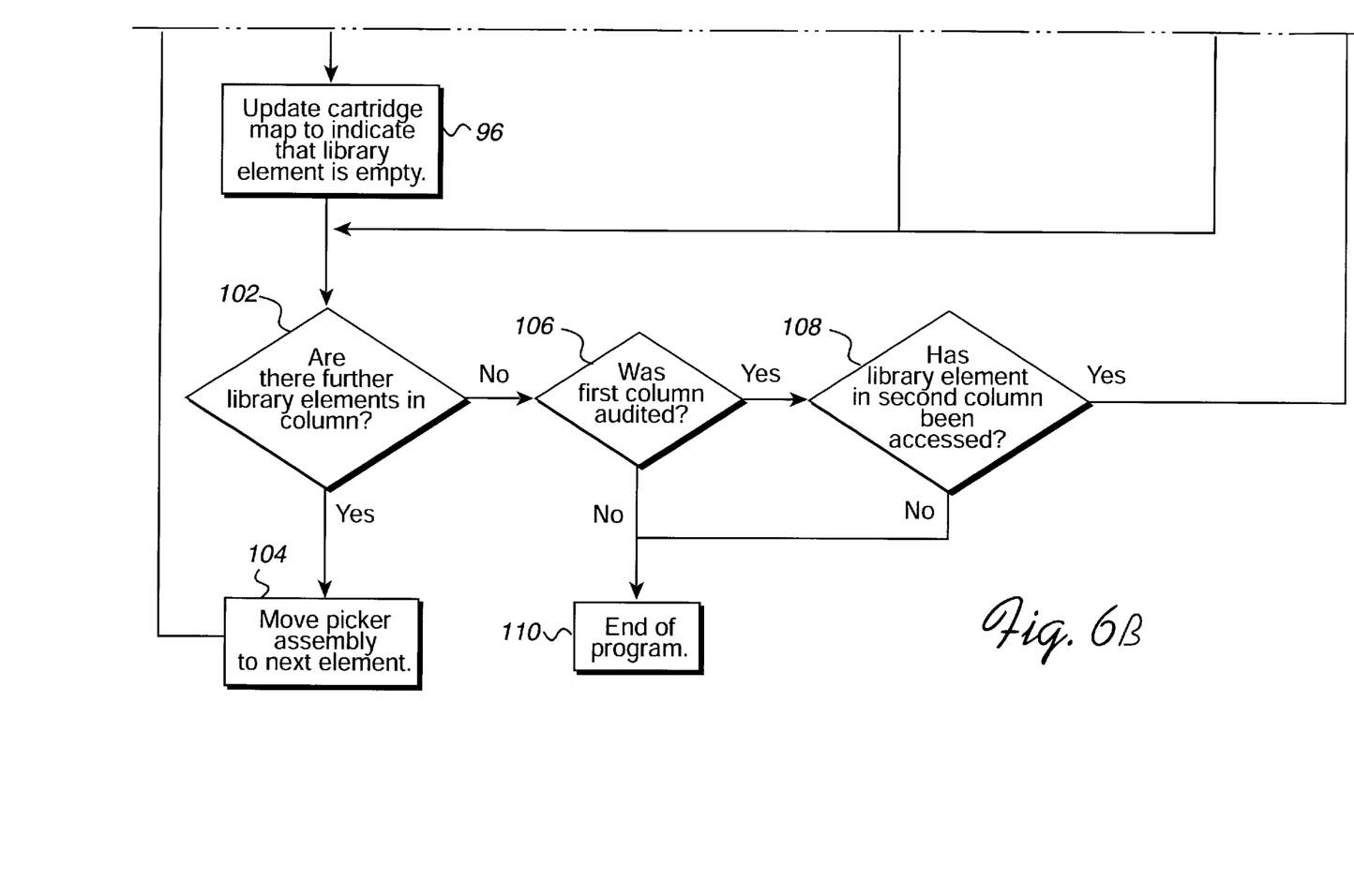

FIGS. 5 and 6 are flowcharts illustrating logic implemented in the microcode and/or hardware of the library controller 22 described with respect to FIGS. 2, 3, and 4 to audit the contents of the library elements. Those skilled in the art will recognize that this logic is provided for illustrative purposes only and that different logic may be used to accomplish the same results.

FIG. 5 is a flowchart illustrating logic implemented in the microcode of the library controller 22 to indicate those library elements that may have been changed. The logic is described with respect to the retrieval system illustrated in FIG. 3. However, those skilled in the art will appreciate that the logic can apply to alternative storage retrieval architectures, such as the alternative architecture shown in FIG. 4. Control begins at block 64 which represents the library controller 22 detecting that the access door has been opened. Control then transfers to block 66 which represents the autochanger mechanism 30, i.e., the picker assembly 48 and/or carriage assembly 46, completing the current operation or immediately halting operation. In both cases, the picker assembly 48 will move out of the path between the sensors 50a, b and 52a, b where the beams will be generated. In this way, only operator action will interrupt the beam. In certain embodiments, the operator must enter a command to open the door. Prior to opening the door or releasing a lock to allow the operator to open the door, the library controller 22 would direct the picker assembly 48 and/or carriage assembly 46 to complete the current operation and move out of the path between the sensors 50a, b and 52a, b.

Control then transfers to block 68 which represents the library controller 22 activating sensors 50a, b and 52a, b to monitor the two vertical beams extending the length of each column 42a, b of storage cells. In certain embodiments, at block 68 a beam may already be generated between the sensors 50a, b and 52a, b. In such case, at block 68 the controller 22 would signal the receiving sensor 50a, b to notify the controller 22 of any interruption in the beam path. In alternative embodiments, at block 68 the controller 22 may have to take the additional step of activating the beam between the sensors 50a, b and 52a, b if no beam was previously generated. Control then transfers to block 70 which is a decision block representing the library controller 22 determining whether one of the vertical beams has been interrupted. In preferred embodiments, one of the upper sensors 50a, b may signal the library controller 22 that the beam has been interrupted when the sensor 50a, b does not detect the beam while the transmitting sensor 52a, b is transmitting the light beam.

If a light beam was interrupted, then control transfers to block 72 which represents the library controller 22 indicating the column 42a, b covered by the interrupted beam. This indication identifies the column 42a, b of library elements that may have been interrupted while the access door was opened. Such indication may be made to a field in the cartridge map maintained in the RAM 24. From block 72, control transfers back to block 70 to process the next action. If the beam has not been interrupted, then control transfers to block 74 which represents the library controller 22 determining whether the access door has been shut If so, control transfers to block 76 which represents the end of the logic. If the access door has not been shut, then from block 74 control transfers back to block 70 to take appropriate action upon either the vertical beam being interrupted or the access door being shut.

FIG. 6 illustrates logic implemented in microcode that controls the library controller 22 to audit the tape library. As with FIG. 5, the logic of FIG. 6 is described with respect to the library architecture shown in FIG. 4. However, those skilled in the art will appreciate that the logic of FIGS. 2, 3, and 4 could apply to library retrieval systems different from the arrangements shown in FIGS. 5 and 6. Control begins at block 80 which represents the library controller 22 processing a command to audit the tape library 20. The library controller 22 may receive such a command from the host system 36 after the host system 36 receives notification that the access door was opened. Alternatively, the library controller 22 may generate such a command at predetermined intervals or upon detecting that a library element was accessed using the logic of FIG. 5. Control transfers to block 82 which represents the library controller 22 checking whether a first column 42a of library elements was accessed. In preferred embodiments, the library controller 22 maintains information on which columns 42a, b were accessed according to the preferred logic of FIG. 5. If a library element in the first column was accessed, then control transfers to block 84; otherwise, control transfers to block 86. Block 84 represents the library controller 22 moving the carriage 46 and picker assembly 48 to the first library element in the first column 42a.

If a library element in the fist column 42a was not accessed, then at block 86, the library controller 22 determines whether the second column 42b of library elements was accessed, i.e., was the light beam extending across the second column 42b previously interrupted. If so, control transfers to block 88 which represents the library controller 22 moving the carriage 46 and picker 48 assemblies to the first library element in the second column 42b. Otherwise, if both the first and second columns 42a, b had not been accessed when the access door was previously opened, then control transfers to block 90 which represents the end of the audit program as no library element in either column was altered. In certain embodiments, the library controller 22 may transmit a message to the host system 36 indicating that the inventory status is unchanged.

From blocks 84 and 88, control transfers to block 92 which is a decision block representing the library controller 22 causing the picker assembly 48 to determine whether there is a cartridge in the library element slot. If so, control transfers to block 94; otherwise, control transfers to block 96. In embodiments where the library 20 includes a machine vision device, the machine vision device can scan the library element to detect if a storage cartridge is present. Alternatively, the library controller 22 could cause the picker 48 to mechanically check if a tape is in the library element slot. If a storage cartridge is in the library element, then at block 94, the library controller 22 updates the cartridge map 32 to indicate that the library element is not empty. Control transfers to block 98 which is a decision block representing the library controller 22 determining whether volume information is maintained for the library element. For instance, the cartridge map 32 may only maintain volume information for storage cells and not drives 44 nor input/output slots. If volume information is maintained for the library element at issue, control transfers to block 100 which represents the library controller 22 accessing the volume information for the cartridge to update the cartridge map with the volume information for the cartridge. In embodiments including machine vision capability, the library controller 22 can cause the machine vision device to read the label on the cartridge, which may have alpha-numeric characters or a bar code, to obtain the volume information. Alternatively, if there is no machine vision device, the carriage 46 and picker 48 assemblies can transfer the cartridge to a drive 44 to read the volume information from the cartridge, and then return the cartridge to its originating library element.

If the library element is found empty, then at block 96 the library controller 22 updates the cartridge map 32 to indicate that the library element is empty. After updating the cartridge map 32 at blocks 96, 98, and 100, control transfers to block 102 to determine whether there are further library elements in the current column 42a, b. If so, control transfers to block 104 to move the picker assembly 48 to the next library element in the column 42a, b and then back to block 92 to update the cartridge map 32 for the current element. If there are no further library elements in the column 42a, b, then control transfers to block 106 which represents the library controller 22 determining whether the first column has been checked. If so, control transfers to block 108 to determine if the second column 42b was accessed, i.e., if the beam extending across the second column 42b was interrupted. If the second column 42b was accessed, then control transfers to block 88 et seq. to proceed to audit the library elements in the second column 42b. If the first column 42a was not just audited at block 106, i.e., the second column 42b had just been audited, or at block 108 the second column 42b had not been accessed, as determined according to the logic of FIG. 5, then control transfers to block 110 to end the program.

In alternative embodiments, when the motion detecting device, e.g., light beams, detect access to the library element, the library controller 22 upon notification of such access may set a flag bit in the cartridge map for each library element in the column 42a, b monitored by the motion detecting device, e.g., beam. This flag would that the contents of the library element in such column were accessed while the access door was opened. If the host system 36 requests the status for any or all of the storage cells, then the library controller 22 would then inform the host system 36 whether the contents of the library element were accessed during the time that the access door was previously opened. The library controller 22 or the host system 36 may then determine whether to conduct an audit of the library elements in the manner described above.

Conclusion

This concludes the description of the preferred embodiments of the invention.

The following describes some alternative embodiments for accomplishing the present invention.

In the preferred embodiments two sets of sensors 50a, 52a and 50b, 52b were used to detect a cartridge or added from a particular column. In alternative embodiments, more or less sensors could be used. Further, the sensors could be located in different positions than those described. For instance, to provide further detail on a group of library elements to which a cartridge was added or removed, different groups of sensors may be used to generate multiple vertical beams within a column. Yet further, a single transmitting sensor, such as a laser or motion detecting device, may be used to detect an object intersecting the light beam path.

In further embodiments, there may be more or less columns of library elements, thus, requiring more or less motion detectors, e.g., beams, to monitor access to the contents of library elements while the access door is opened. In further embodiments, the number of elements in a group of elements monitored by a motion detector may be reduced. Decreasing group size and increasing the number of motion detectors to monitor the greater number of smaller groups decreases audit time because fewer unchanged library elements will be audited as the groups subject to auditing include fewer library elements.

In further embodiments, the storage cells, drives, and input/output ports may be arranged in a manner different than that described above. Further, the light beams may be in an orientation other than vertical, such as horizontal or some other orientation wherein the light beam passes over one or more groups of library elements. Moreover, in the above embodiments, the library controller 22 would audit library elements from top to bottom. However, in alternative embodiments, the library controller 22 may audit the contents of the library elements in a sequence and ordering different than hat described above.

In the above embodiments, the cartridge map 32 maintained information on the volumes associated with a storage cartridge. In further embodiments, additional information on the cartridges may be maintained in the cartridge map.

In summary, preferred embodiments in accordance with the present invention provide a system for indicating whether a group of at least one library element was accessed. The library elements are contained within a housing and are capable of holding storage cartridges. A controller is signaled when an access door of the housing is in an open position. An operator may access the library elements when the access door is in the open position. A motion detector directed toward the group of library elements is activated to detect whether at least one library element in the group was accessed. The motion detector signals the controller upon detecting that at least one library element in the group was accessed. The controller then indicates in a memory area that at least one of the library elements in the group was accessed after the controller is signaled that the access door is in the open position and that at least one library element in the group was accessed.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A library of storage cartridges, comprising:
   a housing;
   a plurality of library elements within the housing, wherein each library element is capable of holding a storage cartridge;
   an access door to the housing, wherein an operator may access the library elements when the access door is in an open position;
   a controller,
   a motion detector positioned in the housing and directed toward a group of at least one library element, wherein the motion detector includes logic to signal the controller upon detecting that at least one library element in the group of library elements was accessed; and
   a memory area accessible to the controller including data generated by the controller that indicates whether the content of at least one library element in the group of library elements was accessed when the access door was in the open position.

2. The library of claim 1, wherein the storage cartridges are a member of the type of storage cartridges comprising optical disks, magnetic disks, and magnetic tapes.

3. The library of claim 1, wherein the motion detector is comprised of a first sensor and a second sensor, wherein the group of library elements are positioned between the first and second sensors, wherein the first sensor includes logic to generate a light beam path received at the second sensor, and wherein the logic to signal the controller upon detecting that at least one library element in the group of library elements was accessed is comprised of logic implemented in the second sensor to control the second sensor to signal the controller when the light beam path is interrupted.

4. The library of claim 1, wherein the memory includes a cartridge map including information on the contents of the library elements, further including:
   means for accessing the library elements in the group;
   means for determining the actual contents of the accessed library element;
   means for updating the information in the cartridge map with information on the actual contents of the accessed library element.

5. The library of claim 1, wherein the memory area further includes a cartridge map including information on the contents of the library elements, further including:
- a movable carriage assembly;
- a machine vision device slidably mounted on the carriage assembly;
- a controller generating signals that control the movable carriage assembly and machine vision device to position the machine vision device adjacent to a library element; and
- a scanning beam generated by the machine vision device capable of determining the contents of the library element located adjacent to the machine vision device, wherein the controller includes logic to update the cartridge map with information on the determined contents of the library element.

6. The library of claim 5, further including logic implemented in the machine vision device to generate a first scanning beam to detect whether a storage cartridge is positioned in the library element adjacent the machine vision device and to generate a second scanning beam to read a label on the storage cartridge.

7. The library of claim 1, wherein the memory area further includes a cartridge map including information on the contents of the library elements further including:
- a movable carriage;
- a picker assembly slidably mounted to the movable carriage, wherein the controller includes logic to transmit signals to control the movable carriage and picker assemblies to position the picker assembly adjacent to a library element, and to control the picker assembly to manipulate the storage cartridge; and
- a drive capable of reading the storage cartridge located in the path of the picker assembly and movable carriage, wherein the drive reads information on the contents of the storage cartridge.

8. The library of claim 1, wherein the group of library elements in the array is a first group and wherein the motion detector directed toward the first group of library elements is a first motion detector, further comprising:
- a second motion detector directed toward a second group of library elements, wherein the second motion detector includes logic to signal the controller upon detecting that a library element in the second group was accessed, and wherein the memory area includes data indicating whether a library element in the second group was accessed when the access door was in the open position.

9. The library of claim 8, wherein the memory includes a cartridge map including information on the contents of the library elements, further comprising:
- means for accessing the library elements in at least one of the first and second groups, wherein the data in the memory area indicates that at least one of the first and second light beam paths were interrupted;
- means for determining the actual contents of the accessed library element; and
- means for updating the information in the cartridge map with information on the actual contents of the accessed library elements.

* * * * *